(12) United States Patent
Brown et al.

(10) Patent No.: US 10,911,361 B2
(45) Date of Patent: Feb. 2, 2021

(54) SYSTEM AND METHOD FOR TRACKING DOMAIN NAMES FOR THE PURPOSES OF NETWORK MANAGEMENT

(71) Applicant: Opanga Networks, Inc., Seattle, WA (US)

(72) Inventors: Sean Brown, Tacoma, WA (US); John Burnette, Seattle, WA (US); Ben Hadorn, Shoreline, WA (US); Hugo Garza, Seattle, WA (US); Ethan Nordness, Seattle, WA (US)

(73) Assignee: Opanga Networks, Inc., Seattle, WA (US)

(*) Notice: Subject to any disclaimer, the term of this patent is extended or adjusted under 35 U.S.C. 154(b) by 0 days.

(21) Appl. No.: 15/965,660

(22) Filed: Apr. 27, 2018

(65) Prior Publication Data

US 2018/0316618 A1 Nov. 1, 2018

Related U.S. Application Data

(60) Provisional application No. 62/491,581, filed on Apr. 28, 2017.

(51) Int. Cl.
| *H04L 12/851* | (2013.01) |
| *H04L 12/743* | (2013.01) |
| *H04L 29/12* | (2006.01) |
| *H04L 12/927* | (2013.01) |

(52) U.S. Cl.
CPC ...... *H04L 47/2441* (2013.01); *H04L 45/7453* (2013.01); *H04L 47/80* (2013.01); *H04L 61/1511* (2013.01)

(58) Field of Classification Search
CPC . H04L 47/2441; H04L 45/7453; H04L 47/10; H04L 47/80; H04L 61/1511; H04L 67/2847; H04L 67/02; H04L 67/1036; H04L 29/12066
See application file for complete search history.

(56) References Cited

U.S. PATENT DOCUMENTS

| 8,509,787 | B2 | 8/2013 | Roddy et al. | |
| 9,253,068 | B1* | 2/2016 | Wu | H04L 63/0245 |
| 2006/0011720 | A1 | 1/2006 | Call | |
| 2006/0029016 | A1* | 2/2006 | Peles | H04L 43/022 370/328 |
| 2008/0010665 | A1* | 1/2008 | Hinton | G06F 21/41 726/1 |
| 2009/0069014 | A1* | 3/2009 | Rune | H04W 36/12 455/436 |
| 2010/0138910 | A1 | 6/2010 | Aldor et al. | |
| 2012/0327778 | A1 | 12/2012 | Stanwood et al. | |

(Continued)

OTHER PUBLICATIONS

International Search Report and Written Opinion for PCT/US2018/030014 dated Sep. 13, 2018.

(Continued)

*Primary Examiner* — Kibrom T Hailu

(57) ABSTRACT

A method includes intercepting a first data packet being transmitted from a domain name system (DNS) server to a first client device, the first data packet being a DNS response, extracting a first internet protocol (IP) address and a first hostname from the first data packet, and storing the first IP address and the first hostname in a first entry of an identification table.

17 Claims, 12 Drawing Sheets

(56) References Cited

U.S. PATENT DOCUMENTS

| | | |
|---|---|---|
| 2012/0327779 A1 | 12/2012 | Gell et al. |
| 2013/0298241 A1* | 11/2013 | Gerber ................ H04L 41/5038 726/24 |
| 2014/0059225 A1* | 2/2014 | Gasparakis ......... H04L 29/0818 709/226 |
| 2015/0334116 A1* | 11/2015 | Martini ............... H04L 61/1511 726/1 |
| 2016/0087932 A1* | 3/2016 | Hergenhan .......... H04L 12/6418 709/218 |
| 2016/0127238 A1* | 5/2016 | McCollum ............. H04L 47/10 709/224 |
| 2016/0127317 A1* | 5/2016 | Ardeli ................. H04L 63/0236 726/14 |
| 2016/0191310 A1* | 6/2016 | Brandwine ............. H04L 45/16 709/220 |
| 2016/0218977 A1* | 7/2016 | Lapidous ............ H04L 61/1511 |
| 2016/0219024 A1 | 7/2016 | Verzun et al. |
| 2016/0255539 A1* | 9/2016 | Mizukoshi ........ H04W 72/0486 370/329 |
| 2016/0261510 A1 | 9/2016 | Burnette et al. |
| 2016/0323186 A1 | 11/2016 | Dillon |
| 2016/0323409 A1* | 11/2016 | Kolhi .................. H04L 61/1511 |
| 2016/0373409 A1* | 12/2016 | Zhu ..................... H04L 61/1511 |
| 2018/0006912 A1* | 1/2018 | Sokolik ................ H04L 43/062 |

OTHER PUBLICATIONS

Search Report dated Oct. 9, 2020 for European Application No. 18790188.9.

* cited by examiner

SYSTEM AND METHOD FOR TRACKING DOMAIN NAMES FOR THE PURPOSES OF NETWORK MANAGEMENT

CROSS-REFERENCE TO RELATED APPLICATION

This patent document claims the benefit of U.S. Provisional Patent Application No. 62/491,581, filed on Apr. 28, 2017, which is incorporated by reference herein for all purposes.

BACKGROUND

Data can traverse a network in the form of network traffic. Network traffic may include one or more encapsulated packets that are transmitted across a network between two endpoints. For example, a data packet traverses a data network from a content server to a user equipment.

Identifying network traffic is important for various network management and analysis applications. Historically, network traffic has been used by network service providers to understand traffic patterns and consumer behavior on their networks.

Network traffic can be identified by an identification string that defines a realm of administrative autonomy, authority, and/or control within the Internet. For example, network traffic can be identified by hostnames that identify endpoints of the network traffic.

Network identification information, such as hostnames, can be derived by performing deep packet inspection of application layer data of data packets in individual data flows. However, identifying network traffic using traditional means has become difficult, time-consuming, and otherwise troublesome with the adoption of encryption by Transport Layer Security (TLS) or Secure Sockets Layer (SSL). Payloads of data packets are now encrypted. As a result, past implementations that have relied on deep packet inspection techniques (e.g., reading into application layer data) are no longer viable due to encryption, which now hides most that data.

Deep packet inspection has other drawbacks. For example, deep packet inspection has also historically been an expensive computational operation with negative side effects for networks.

Accordingly, a new strategy for identifying network traffic carrying encrypted data packets, and which does not require computationally expensive deep packet inspection processes, would be advantageous for performing network analysis and management techniques.

BRIEF SUMMARY

In various embodiments of the present disclosure, a method includes intercepting a first data packet being transmitted from a domain name system (DNS) server to a first client device, the first data packet being a DNS response; extracting a first internet protocol (IP) address and a first hostname from the first data packet; and storing the first IP address and the first hostname in a first entry of an identification table.

In an embodiment, the method further includes intercepting a second data packet being transmitted from a content server to a second client device; extracting the first IP address from a header of the second data packet; determining a characteristic of the second data packet; and updating the first entry of the identification table with the determined characteristic.

In an embodiment, the determined characteristic is an amount of bytes in the second data packet, a timestamp of the second data packet, or a combination thereof.

In an embodiment, the method further includes pruning the first entry from the identification table based on the determined characteristic when the identification table exceeds a predetermined size.

In an embodiment, the method further includes intercepting a second data packet being transmitted from a content server to a second client device; extracting a second IP address from a header of the second data packet; identifying a characteristic associated with the second IP address by accessing a second entry in the identification table; and managing a data flow including the second data packet based on the characteristic associated with the second IP address.

In an embodiment, managing the data flow includes causing the data flow to be transferred to the second user device over surplus network capacity of a network.

In an embodiment, a payload of the second data is encrypted, and the second IP address is extracted from the header without performing decryption.

In an embodiment, the characteristic associated with the second IP address is a hostname associated with the second IP address, an amount of transferred bytes associated with the second IP address, a timestamp associated with the second IP address, or a combination thereof.

In an embodiment, extracting the IP address and the hostname from the first data packet includes reading the IP address and the hostname from resource records (RRs) in the DNS response.

In an embodiment, reading the IP address and the hostname from RRs in the DNS response includes reading the IP address in an 'RDATA' field of the DNS response and reading the hostname in a 'NAME' field of the DNS response.

In an embodiment, the identification table is a hash table.

According to various embodiments of the present disclosure, a system includes a processor; and a memory storing program commands that, when executed by the processor, cause the first processor to: intercept a first data packet being transmitted from a domain name system (DNS) server to a first client device, the first data packet being a DNS response; extract a first internet protocol (IP) address and a first hostname from the first data packet; and store the first IP address and the first hostname in a first entry of an identification table.

In an embodiment, the program commands, when executed by the processor, further cause the processor to: intercept a second data packet being transmitted from a content server to a second client device; extract the first IP address from a header of the second data packet; determine a characteristic of the second data packet; and update the first entry of the identification table with the determined characteristic.

In an embodiment, the program commands, when executed by the processor, further cause the processor to: intercept a second data packet being transmitted from a content server to a second client device; extract a second IP address from a header of the second data packet; identify a characteristic associated with the second IP address by accessing a second entry in the identification table; and manage a data flow including the second data packet based on the characteristic associated with the second IP address.

In an embodiment, the processor extracts the IP address and the hostname from the first data packet by reading the IP address and the hostname from resource records (RRs) in the DNS response.

In an embodiment, reading the IP address and the hostname from RRs in the DNS response includes reading the IP address in an 'RDATA' field of the DNS response and reading the hostname in a 'NAME' field of the DNS response.

According to various embodiments of the present disclosure, a system includes a domain name system (DNS) spy including a first processor and a first memory, the first memory storing program commands that, when executed by the first processor, cause the first processor to: extract a plurality of internet protocol (IP) addresses and a plurality of hostnames from a plurality of first data packets, respectively, each of the first data packets being a DNS response; and store the plurality of IP addresses and the plurality of hostnames in a plurality of entries of an identification table, the identification table being indexed by the plurality of IP addresses; and a transport manager including a second processor and a second memory, the second memory storing program commands that, when executed by the second processor, cause the second processor to: extract a second IP address from a header of a non-DNS packet; determine a second hostname corresponding to the second IP address by accessing reading one of the plurality of entries including the second IP address; and manage a data flow based on the second hostname, the data flow including the second packet.

DETAILED DESCRIPTION

Various embodiments of the present disclosure relate to a system and method for identifying domain name service (DNS) responses transmitted from a server, parsing the DNS responses to create a mapping between a content delivery network (CDN) server's internet protocol (IP) address(es) and the domain name based on the DNS responses, further identifying a specific data flow from a client to a server by this domain name, applying a traffic management policy or statistics collection based on the mapped domain name/server IP address, cleaning/expiring entries from the map based on a significance of data transferred and activity, collecting/storing statistical data on previously mentioned data flows as a whole or as determined by the domain name, and determining the most significant domain name(s) on a given network by analyzing the whole of the statistical data collected.

According to an embodiment, a device, a system, a method, or a combination thereof, can be used to capture and create a mapping, or cache, of hostname and corresponding server IP addresses of a variety of data flows, even when application level packet data in the data flows is encrypted.

As used herein, the term "hostname" refers to a name of a specific host, content provider, content, or a combination thereof. A hostname is, for example, a nickname, a nodename, a domain name, a web address, or a combination thereof.

In an embodiment, a reverse DNS lookup table is generated. A device accesses the table, and uses entries within the table to identify one or both endpoints of data flows traversing a network. The device implements network management policies based on the identified endpoints. For example, a transport manager accesses the table, uses the table to identify that an endpoint of a specific data flow has been historically associated with relatively burdensome data flows, and paces the data flow.

Figure 1:
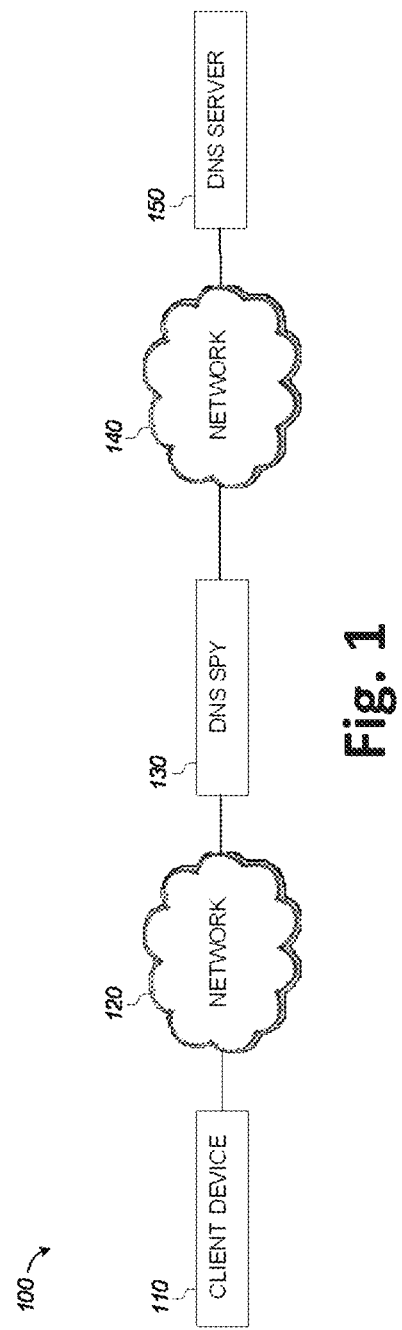
FIG. 1 illustrates a system architecture according to an embodiment of the present disclosure.

FIG. 1 illustrates a system 100 architecture according to an embodiment of the present disclosure.

The system 100 includes a client device 110, a first network 120, a DNS spy 130, a second network 140, and a DNS server 150.

The client device 110 is configured to receive one or more inputs from one or more users, and to communicate with the DNS server via the first and second networks 120 and 140. The client device 110 is, for example, a desktop computer, a laptop computer, a tablet device, a smartphone, an e-reader, a smart watch, a smart television, or a combination thereof.

The first network 120 is a wired or wireless network that connects the client device 110 and the DNS spy 130 to each other. According to various embodiments, the first network 120 may be any network that enables communication between or among machines, databases, and devices. Accordingly, the first network 120 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof. In a specific embodiment, the first network 120 includes a core collection of sub-nodes linking to a radio access network (RAN).

The DNS spy 130 is connected between the client device 110 and the DNS server 150 via the first network 120 and the second network 140. In various embodiments, the DNS spy 130 is configured to intercept DNS responses sent from the DNS server 150 to the client device 110, and to generate and/or update an identification table based on hostname/IP address pairs in the DNS responses. The DNS spy 130 may also intercept other types of packets traversing the first network 120, the second network 140, or both, (e.g., non-DNS data packets) and update the identification table based on characteristics of the intercepted packets. For example, the DNS spy 130 may update an existing entry including a hostname/IP address pair with a size, a timestamp, or both, derived from an intercepted non-DNS packet.

The second network 140 is a wired or wireless network that connects the DNS spy 130 and the DNS server 150 to each other. In a specific embodiment, the second network 140 is the Internet.

The DNS server 150 is a server device configured to generate DNS responses in response to DNS requests from various client devices, including the client device 110. Upon receiving a DNS request that specifies a specific hostname, the DNS server 150 looks up an IP address associated with the specific hostname. The DNS server 150 then transmits the IP address to the requesting device, so that the requesting device can access a content server associated with the hostname.

In an embodiment, the client device 110 transmits a DNS request to the DNS server 150 via one or more networks, such as the first and second networks 120 and 140. The DNS response includes a hostname, for example, a name of a video-hosting website, such as "YOUTUBE" or "YOUTUBE.COM."

When the DNS server 150 receives the DNS request, the DNS server 150 extracts the hostname from the DNS request, and looks up an IP address associated with the hostname. The DNS server 150 generates a DNS response that includes the hostname and the IP address associated with the hostname. The DNS server 150 transmits the DNS response back to the client device 110 over the first and second networks 120 and 140.

The DNS spy 130 intercepts the DNS response. Because the DNS response is not encrypted, the DNS spy 130 extracts the hostname and the IP address from the DNS response without performing decryption. The DNS spy 130 then stores the hostname/IP address pair in an entry of an identification table. The DNS spy 130 maps multiple hostname/IP address pairs to entries of the identification table by intercepting and inspecting multiple DNS responses.

According to an embodiment, the DNS spy 130 controls a size of the identification table by pruning the identification table when a triggering event occurs. For example, the DNS spy 130 deletes one or more entries in the identification table when the identification table reaches a predetermined size.

In various embodiments, the DNS server 150 is unable to return a hostname based on a given IP address. However, a device accessing the identification table (e.g., a transport manager) can determine a hostname associated with a specific IP address by identifying an entry including the specific IP address. The identification table generated by the DNS spy 130 can therefore be used to perform a reverse DNS lookup operation, according to various embodiments.

Figure 2:
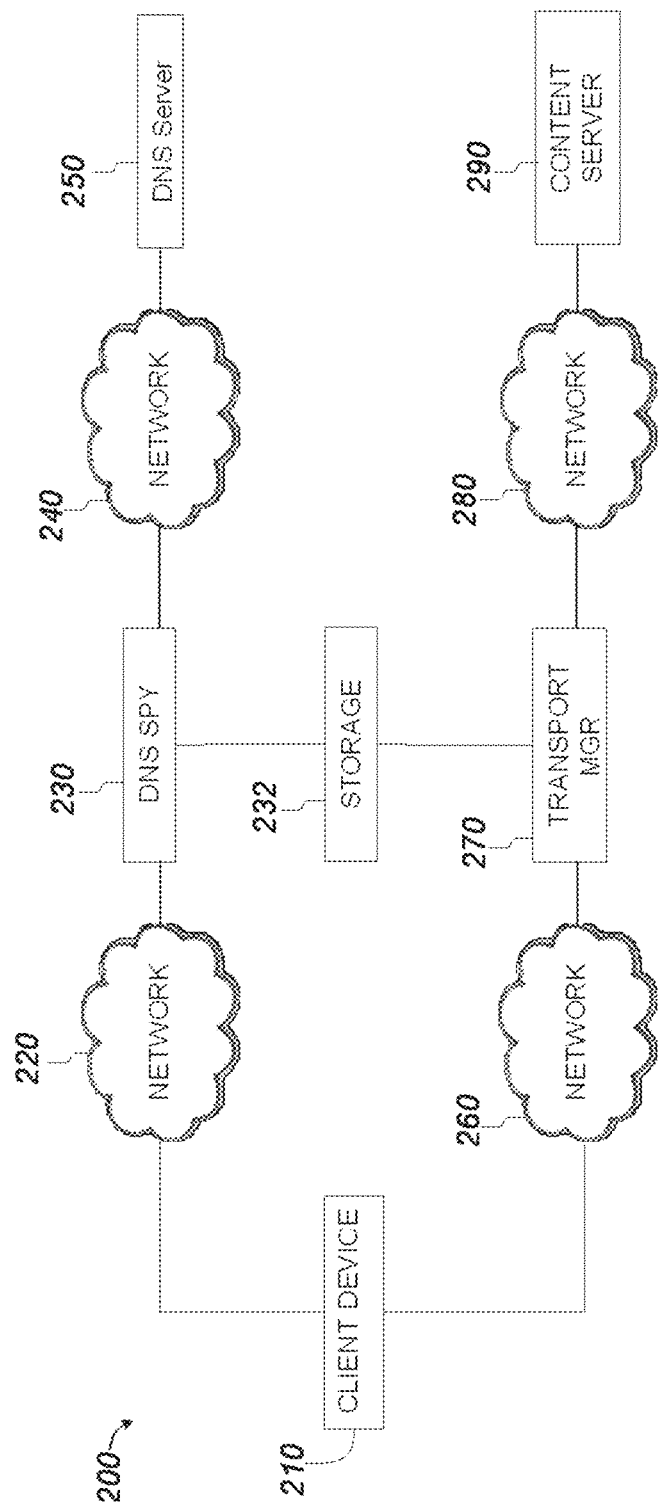
FIG. 2 illustrates a system architecture according to an embodiment of the present disclosure.

FIG. 2 illustrates a system 200 architecture according to an embodiment of the present disclosure.

The system 200 includes a client device 210, a first network 220, a DNS spy 230, a second network 240, a DNS server 250, a third network 260, a transport manager 270, a fourth network 280, and a content server 290. Although FIG. 2 only illustrates one of each of the client device 210, the first network 220, the DNS spy 230, the second network 240, the DNS server 250, the third network 260, the transport manager 270, the fourth network 280, and the content server 290, the system 200 can include a plurality of each of the client device 210, the first network 220, the DNS spy 230, the second network 240, the DNS server 250, the third network 260, the transport manager 270, the fourth network 280, and the content server 290 according to various embodiments. For example, multiple client devices 210 can be connected to the first network 220, the third network 260, or both, multiple DNS servers 250 can be connected to the second network 240, and multiple content servers 290 can be connected to the fourth network 280.

In various embodiments, the client device 210, the first network 220, the DNS spy 230, the second network 240, and the DNS server 250 are equivalent to the client device 110, the first network 120, the DNS spy 130, the second network 140, and the DNS server 150 described above with respect to FIG. 1. In certain embodiments, the first network 220 is the same as the third network 260, and the second network 240 is the same as the fourth network 280. Accordingly, the DNS spy 230, the transport manager 270, or both, are between the client device 210 and the DNS server 250, the client device 210 and the content server 290, or both.

When the client device 210 receives a DNS response including a requested IP address from the DNS server 250, the client device 210 generates a request for content including the IP address. The client device 210 transmits the request for content to the content server 290 over the third and fourth networks 260 and 280.

Equipment associated with the third and fourth networks 260 and 280 route the request for content to the content server 290 using the IP address. In a specific embodiment, the third network 260 is the first network 220, and the fourth network 280 is the second network 240.

When the content server 290 receives the request for content, the content server 290 transmits the requested content to the client device 210.

In various embodiments, the request for content from the client device 210, the content from the content server 290, or both, are each transmitted in the form of one or more data packets. The data packets are non-DNS data packets, for example.

The transport manager 270 is configured to intercept the request for content transmitted from the client device 210 to the content server 290, the one or more data packets transmitted from the content server 290 to the client device 210, or both. According to various embodiments, the transport manager 270 intercepts data packets transported over the third network 260 between one or more client devices and one or more content servers.

The transport manager 270 is located between the client device 210 and the content server 290. In an embodiment, the transport manager 270 is at a border traffic aggregation point connecting the third network 260 to the fourth network 280. In an example in which the third network 260 is a 3rd Generation Partnership Project (3GPP) standard mobile network, the aggregate point is part of the sGi-LAN connecting to the Packet Data Network (PDN)-Gateway core element and outwards to the Internet. In an example in which the third network 260 is a 4G network, the aggregate point is part of a Gi-LAN connecting to a gateway GPRS support node (GGSN)-Gateway and outwards to the Internet. However, in other embodiments, the transport manager 270 is located elsewhere.

The transport manager 270 manages data traffic transmitted over the third network 260. In certain embodiments, the transport manager 270 is configured to optimize network resources, alleviate congestion, perform other data management operations, or a combination thereof, in the third network 260 by managing data traffic through the third network 260. For example, the transport manager 270 paces a data flow between the client device 210 and the content server 290 based on one or more policies stored at the transport manager 270. The transport manager 270 paces the data flow after identifying that the data flow is relatively burdensome to the third network 260, determining that the third network 260 currently congested, determining that the data flow is relatively unimportant compared to other data flows traversing the third network 260, or a combination thereof.

The transport manager 270 paces the data flow by throttling the data flow, temporarily storing data packets in the data flow, requiring the data flow to traverse a network other than the third network 260, or a combination thereof. For example, the transport manager 270 may pace the data flow by requiring data packets within the data flow to traverse a local WIFI network, rather than the third network 260, when the WIFI network connects the client device 210 to the content server 290.

Further details regarding the pacing of data flows may be found in commonly-assigned U.S. application Ser. No. 15/060,486, entitled "SYSTEMS AND METHODS FOR PACING DATA FLOWS," which was filed on Mar. 3, 2016, and hereby incorporated by reference in its entirety.

In various embodiments, the transport manager 270 selectively paces elephant flows traversing the third network 260. An elephant flow is a data flow that is relatively burdensome to the third network 260. For example, an elephant flow is a data flow including an amount of transferred data that is greater than a threshold, a data flow with a duration that exceeds a threshold duration, a data flow including data packets with a particular file type, or a combination thereof.

In some embodiments, a data flow can be identified as an elephant flow by identifying a hostname associated with the data flow. In an embodiment, when a data flow is identified as being to or from a host that has been previously known to be likely to generate elephant flows, the transport manager 270 identifies the data flow as an elephant flow. For example, when the transport manager 270 identifies that the content server 290 is associated with a host that transmits data packet that require a significant amount of network resources, e.g., a video streaming service (e.g., YOUTUBE-.COM, NETFLIX.COM, etc.), the transport manager 270 will automatically identify a data flow between the content server 290 and the client device 210 as an elephant flow and pace the data flow. In another example, when the transport manager 270 identifies that the content server 290 is associated with a gaming service (e.g., POKEMON GO, etc.), the transport manager 270 will automatically identify the data flow between the content server 290 and the client device 210 as an elephant flow and pace the data flow. Further details regarding the management of elephant flows may be found in commonly-assigned U.S. application Ser. No. 15/703,908, entitled "DIRECTED HANDOVER OF ELEPHANT FLOWS," which was filed on Sep. 13, 2017, and hereby incorporated by reference in its entirety.

In an embodiment, the transport manager 270 identifies a data flow between the content server 290 and the client device 210 for management by identifying a hostname associated with the content server 290, according to various embodiments of the present disclosure. The transport manager 270 identifies the hostname by intercepting data packets transmitted between the content server 290 and the client device 210 that traverse the third network 260.

While the data packets include information identifying the hostname, this information is encrypted. For example, the hostname is included in an encrypted payload of each of the data packets.

Rather than decrypting the data packets, in an embodiment, the transport manager 270 identifies the hostname of the content server 290 by extracting the IP address of the content server 290 from one of the data packets, accessing an information table stored in a storage 232, identifying an entry in the information table including the extracted IP address, and determining the hostname by reading the identified entry. The information table is generated by the DNS spy 230, according to various embodiments.

Accordingly, the transport manager 270 manages data flows traversing the third network 260 by accessing the information table generated by the DNS spy, rather than decrypting individual data packets within the data flows.

In some embodiments, the DNS spy 230, the transport manager 270, and the storage 232 are separate and interconnected devices. In other embodiments, the DNS spy 230, the transport manager 270, and the storage 232, are the same device.

FIGS. 3A to 3E illustrate devices according to various embodiments of the present disclosure. Any of the devices shown in FIGS. 3A to 3E may be implemented in a general-purpose computer modified (e.g., configured or programmed) by software to be a special-purpose computer to perform the functions described herein for that machine, database, or device. Moreover, any two or more of the machines, databases, or devices illustrated in FIGS. 3A to 3E may be combined into a single machine, and the functions described herein for any single machine, database, or device may be subdivided among multiple machines, databases, or devices.

Figure 3A:
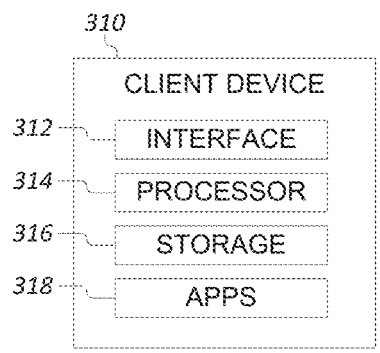
FIG. 3A illustrates a client device according to an embodiment of the present disclosure.

FIG. 3A illustrates a client device 310 according to an embodiment of the present disclosure. The client device 310 may include various types of user devices, such as mobile devices (e.g., laptops, smart phones, tablet computers, and so on), computing devices, set-top boxes, vehicle computing devices, gaming devices, and so on. The client device 310 may support and run various different operating systems, such as Microsoft® Windows®, Mac OS®, iOS®, Google® Chrome®, Linux®, Unix®, or any other mobile operating system, including Symbian®, Palm®, Windows Mobile®, Google® Android®, Mobile Linux®, and so on.

The client device 310 includes an interface 312, a processor 314, a storage 316, and one or more apps 316.

The interface 312 includes, for example, a touch screen, a keyboard, a camera, one or more sensors, or a combination thereof. In an embodiment, the client device 310 receives an input from a user via the interface 312. In a specific embodiment, the input specifies a hostname of a source of content. For example, the input specifies a universal resource locator (URL) address of a specific website on the internet.

The processor 314 executes program commands. The storage 316, for example, stores the program commands that are executed by the processor 312. In an embodiment, the storage 316 is a local memory.

The client device 310 runs the one or more apps 316. In an embodiment, the one or more apps 316 includes an internet browser application, a video streaming application, a video game app, etc.

In an embodiment, the client device 316 is configured to request an IP address of a content server associated with a known hostname and receive a DNS response identifying the requested IP address. The client device 316 further requests content by transmitting a request to the content server using the IP address, and receives the requested content from the content server in the form of one or more data packets.

Figure 3B:
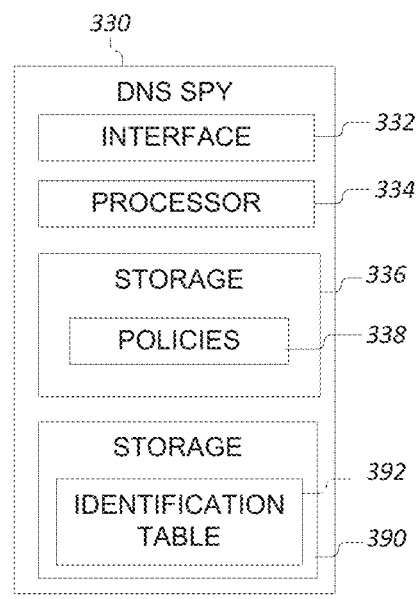
FIG. 3B illustrates a domain name system (DNS) spy according to an embodiment of the present disclosure.

FIG. 3B illustrates a DNS spy 330 according to an embodiment of the present disclosure. The DNS spy 330 includes an interface 332, a processor 334, a first storage 336, and a second storage 390.

The second storage 390 stores an identification table 392 generated by the DNS spy 330. The identification table 392 includes a plurality of entries identifying a plurality of IP address/hostname pairs, respectively, according to an embodiment. Although the second storage 390 is illustrated inside of the DNS spy 330, the second storage 390 may be a storage device that is separate from the DNS spy 330, in an embodiment.

In various embodiments, the DNS spy 330 is located between one or more DNS servers and one or more client devices. DNS response transmitted from the one or more DNS servers and the one or more client devices pass through, or are intercepted by, the DNS spy 220. The DNS spy 220 reads the hostnames and the IP address from resource records (RRs) in the DNS responses, for example. The hostname and the IP address in the RRs of the DNS response are not encrypted.

The DNS spy 330 identifies a plurality of hostname/IP address pairs from the DNS responses. The DNS spy 220 stores the hostname/IP address pairs in the identification table 392 in the second storage 390. In an embodiment, the hostname/IP address pairs are included in respective entries in the identification table 392.

In various embodiments, the identification table 392 is accessible by other devices, such as a transport manager. The transport manager, for example, can manage network traffic by reading entries in the identification table 392.

Figure 3C:
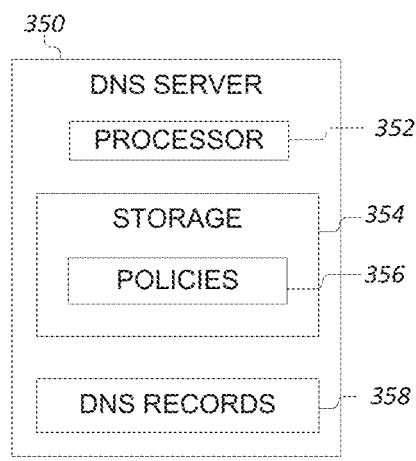
FIG. 3C illustrates a DNS server according to an embodiment of the present disclosure.

FIG. 3C illustrates a DNS server 350 according to an embodiment of the present disclosure. The DNS server 350 includes a processor 352, a storage 354, and DNS records 358.

The processor 352 executes one or more policies 356 stored in the storage 354. For example, the processor 352 executes program commands stored in the storage 354.

When the DNS server 350 receives a DNS request including a hostname, the DNS server 350 searches the DNS records 358 for an IP address associated with the hostname. The IP address is an IP address for a content server associated with the hostname, for example. The DNS records 358 are structured such that the DNS server 350 can search for an IP address associated with a given hostname, but cannot search for a hostname associated with a given IP address.

The DNS server 350 then generates a DNS response including a plurality of RRs that include the hostname and the IP address. The DNS server 350 transmits the DNS response to the source of the DNS request. For example, when the DNS request is transmitted from a client device, the DNS server 350 transmits the DNS response to the client device.

Figure 3D:
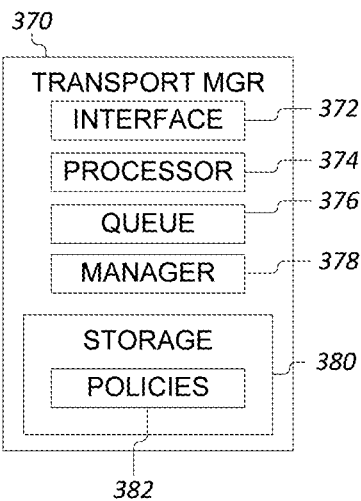
FIG. 3D illustrates a transport manager according to an embodiment of the present disclosure.

FIG. 3D illustrates a transport manager 370 according to an embodiment of the present disclosure.

The transport manager 270 is configured to manage data traffic traversing a network when one or more conditions are satisfied. In some embodiments, the transport manager 370 is a delivery manager that directs or manages the delivery of content via a delivery policy that utilizes or uses surplus network bandwidth or surplus network capacity. A surplus of network bandwidth or network capacity may be network bandwidth or network capacity that is determined to be available (e.g., idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth a total capacity (or, a predetermined percentage of the total capacity). Therefore, the transport manager 370 may direct or manage the delivery of content between content providers (e.g., content servers), network edge caches, and client devices over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

The transport manager 370 includes an interface 372, a processor 374, a queue 376, a manager 378, and a storage 380.

The processor 374 executes one or more policies 382 stored in the storage 380. For example, the processor 374 executes program commands stored in the storage 380. Various functions of the transport manager 370 are executed by the processor 374.

Figure 3F:
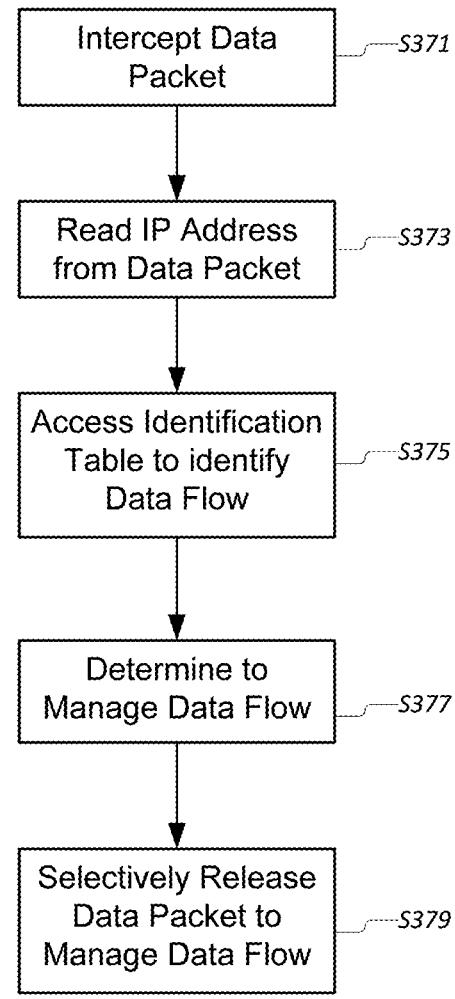
FIG. 3F illustrates an operation of the transport manager of FIG. 3D according to an embodiment.

The transport manager 370 identifies characteristics of data flows traversing a network, and characteristics of the network itself, and manages the data flows based on the characteristics. In an embodiment such as illustrated in FIG. 3F, the transport manager 370 identifies a data flow for management by intercepting a data packet in the data flow (S371), reading an IP address of a source of the data packet from the data packet (S373), and identifying a hostname of the source of the data packet by accessing an identification table (S375).

For example, when the transport manager 370 determines that a data flow traversing a network is an elephant flow based on a hostname of a source of the data flow, the transport manager 370 paces the data flow (S377). In a specific example, the transport manager 370 temporarily stores data including packets of the elephant flow in the queue 376, and selectively releases the packets to their destination over surplus network capacity of a network, when the surplus network capacity is available (S379).

Figure 3E:
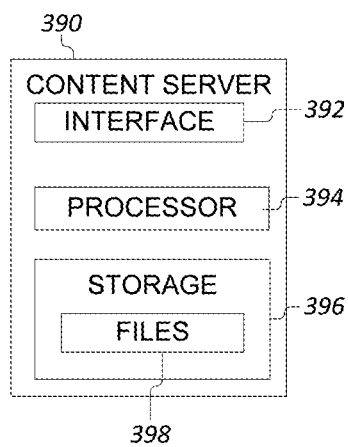
FIG. 3E illustrates a content server according to an embodiment of the present disclosure.

FIG. 3E illustrates a content server 390 according to an embodiment of the present disclosure. The content server 390 includes an interface 392, a processor 394, and a storage 396.

The processor 394 executes one or more policies 392 stored in the storage 396. For example, the processor 394 executes program commands stored in the storage 396. Various functions of the content server 390 are executed by the processor 394.

The content server 390 receives a request for content from a source and transmits one or more of files 398 stored in the storage 396 in response to the request. The content server 390 transmits the one or more files 398 in the form of a plurality of data packets, for example.

The content server 390 may provide a variety of different media and other content types, such as video content (e.g., movies, television shows, news programming, video clips), image content (e.g., image or picture slideshows), audio content (e.g., radio programming, music, podcasts), and so on. The content server 390 may deliver, transfer, transport, and/or otherwise provide media files and other content to network edge caches (not shown), which may deliver, transfer, transport, and/or otherwise provide the content to requesting devices (e.g., user equipment 110 a-c) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

Figure 4:
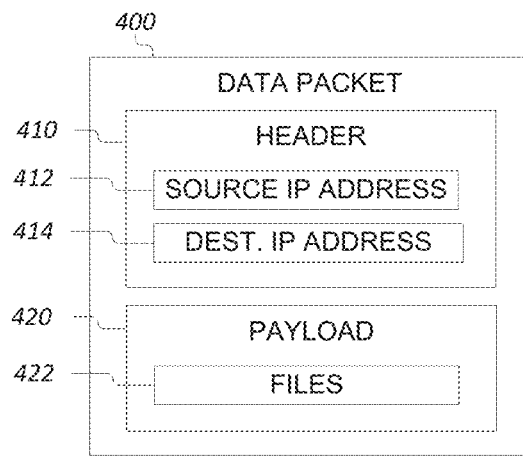
FIG. 4 illustrates a data packet according to an embodiment of the present disclosure

FIG. 4 illustrates a data packet 400 according to an embodiment of the present disclosure. The data packet 400 includes a header 410 and a payload 420.

The header 410 includes a source IP address 412 and a destination IP address 414. The source IP address 412 is an IP address of a source of the data packet 400, and the destination IP address 414 is an IP address of a destination of the data packet 400. The header 410 is not encrypted, according to an embodiment.

The payload 420 includes one or more files 422. The payload 420 includes, for example, application layer data. The payload 420 is encrypted.

In an embodiment, the data packet 400 is transmitted between a content server and a client device, and is intercepted by a transport manager.

Figure 5:
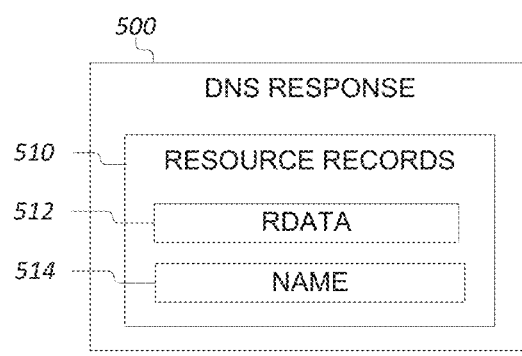
FIG. 5 illustrates a DNS response according to an embodiment of the present disclosure.

FIG. 5 illustrates a DNS response 500 according to an embodiment of the present disclosure.

The DNS response 500 includes a plurality of RRs 510. For example, the RRs 510 include an RDATA field 512 and a NAME field 514. The RDATA field 512 includes an IP address, and the NAME field 514 includes a hostname associated with the IP address.

In an embodiment, the DNS response 500 is transmitted from a DNS server to a client device. Furthermore, the DNS response 500 is not encrypted. A DNS spy, for example, intercepts the DNS response 500 transmitted from the DNS server to the client device, and reads the IP address from the RDATA field 512 and the hostname from the NAME field 514 without performing decryption.

Figure 6:
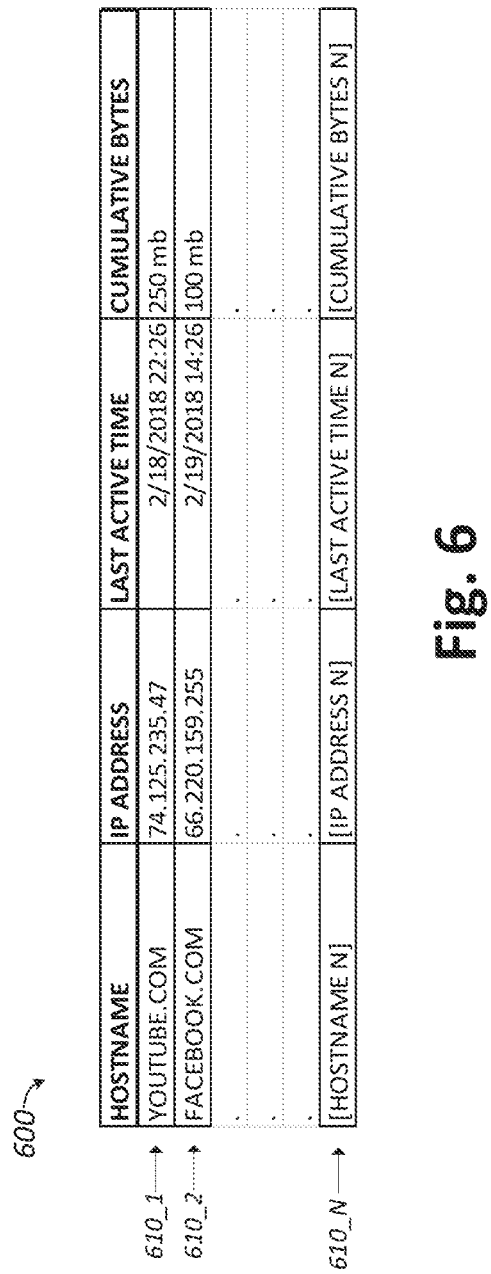
FIG. 6 illustrates an identification table according to an embodiment of the present disclosure.

FIG. 6 illustrates an identification table 600 according to an embodiment of the present disclosure.

The identification table 600 includes a plurality of entries 610_1 to 610_N, where N is a size of the identification table 600. Each of the entries 610_1 to 610_N corresponds to a specific hostname/IP address pair. The identification table 600 is a cache table indexed by the IP addresses of the hostname/IP address pairs, in an embodiment.

Each of the entries 610_1 to 610_N includes an IP address, a hostname, a last active time of a data packet from the IP address, and an amount of cumulative bytes associated with data traffic transmitted from the IP address.

In this disclosure, fields like the last active time and the amount of cumulative bytes may be termed "characteristics" of the corresponding hostname/IP address pairs. In an embodiment, the characteristics are used by a DNS spy to identify one or more least significant entries in the identification table 600. The DNS spy may then prune the least significant entries from the identification table 600 in a pruning operation.

In some embodiments, the characteristics are used by a transport manager to identify hostname/IP address pairs associated with relatively burdensome data flows. For example, the transport manager identifies entries including relatively large amounts of cumulative bytes as likely to be associated with elephant flows.

According to various embodiments, each of the entries 610_1 to 610_N is generated and updated by a DNS spy and stored in a storage.

Figure 7:
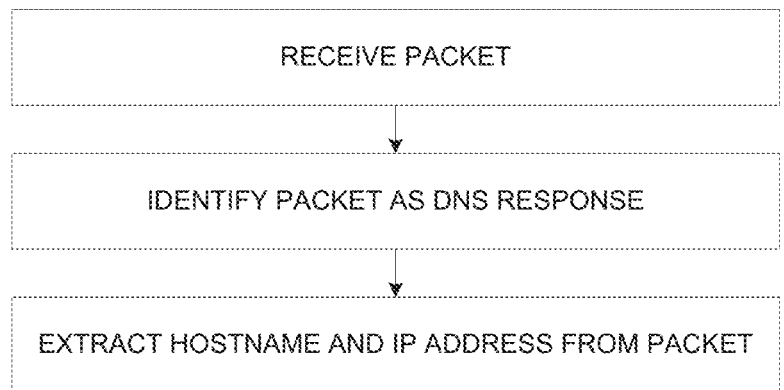
FIG. 7 illustrates a method of extracting a hostname and internet protocol (IP) address from a DNS response according to an embodiment of the present disclosure.

FIG. 7 illustrates a method 700 of extracting a hostname and IP address from a DNS response according to an embodiment of the present disclosure. The method 700 may be performed by a DNS spy, for example.

At S710, a packet is received. In an embodiment, the packet is intercepted as it is being transmitted from a DNS server to a client device.

The packet is identified as a DNS response at S720.

Figure 8:
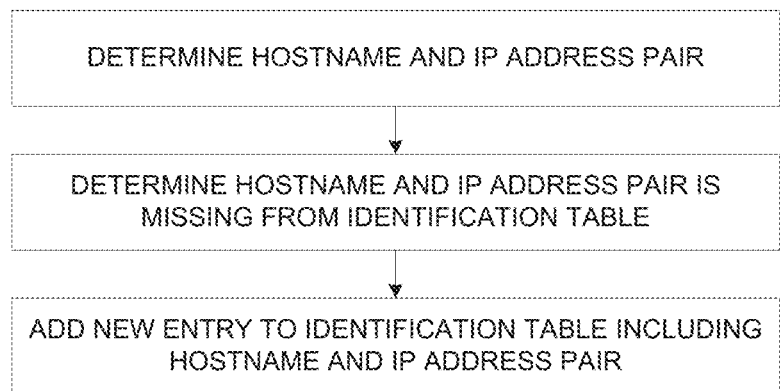
FIG. 8 illustrates a method of adding a new entry to an identification table according to an embodiment of the present disclosure.

After the packet is identified as a DNS response, a hostname and an IP address is extracted from the DNS response at S730. The hostname and the IP address are read from RRs in the DNS response. For example, the hostname is read from a NAME field in the resource records, and the IP address is read from an RDATA field in the resource records FIG. 8 illustrates a method 800 of adding a new entry to an identification table according to an embodiment of the present disclosure. In an embodiment, the method 800 is performed by a DNS spy.

A hostname and IP address pair are determined at S810. For example, the hostname and the IP address are read from a DNS response.

Figure 9:
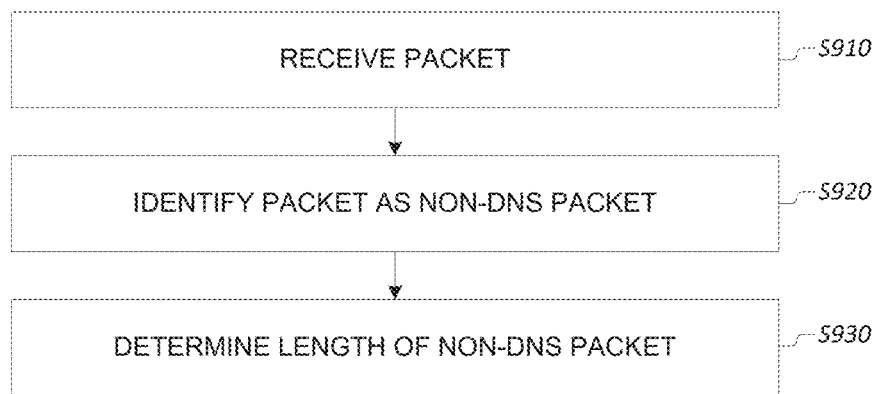
FIG. 9 illustrates a method of determining a length of a non-DNS packet according to an embodiment of the present disclosure.

FIG. 9 illustrates a method 900 of determining a length of a non-DNS packet according to an embodiment of the present disclosure. The method 900 is performed by a DNS spy, for example.

At S910, a data packet is received. In an embodiment, the data packet is intercepted while being transmitted between a content server and a client device.

The data packet is identified as a non-DNS packet at S920. The data packet is not a DNS request or a DNS response. The non-DNS packet is, for example, a video streaming packet.

At S930, a size of the data packet is determined. For example, a number of bytes contained in the packet is determined.

Figure 10:
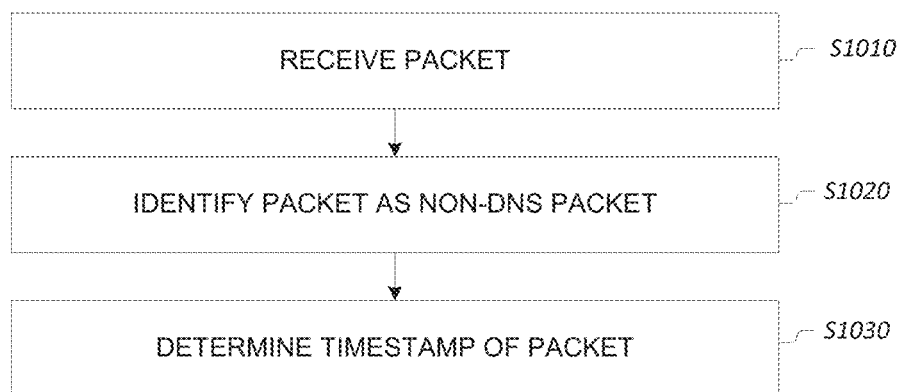
FIG. 10 illustrates a method of determining a timestamp of a non-DNS packet according to an embodiment of the present disclosure.

FIG. 10 illustrates a method 1000 of determining a timestamp of a non-DNS packet according to an embodiment of the present disclosure. The method 1000 is performed by a DNS spy, for example.

At S1010, a data packet is received. In an embodiment, the data packet is intercepted while being transmitted between a content server and a client device.

The data packet is identified as a non-DNS packet at S1020. The data packet is not a DNS request or a DNS response. The non-DNS packet is, for example, a video streaming packet.

Next, at S1030, a timestamp associated with the packet is determined. For example, the timestamp is a time that the data packet is received. In another example, the timestamp is derived from the non-DNS packet directly.

Figure 11:
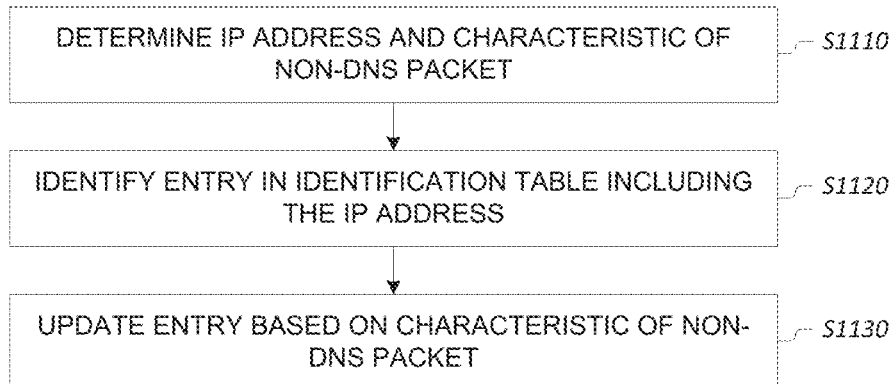
FIG. 11 illustrates a method of updating an entry of an identification table according to an embodiment of the present disclosure.

FIG. 11 illustrates a method 1100 of updating an entry of an identification table according to an embodiment of the present disclosure. The method 1100 is performed by a DNS spy, for example.

At S1110, an IP address and a characteristic of a non-DNS packet are determined. In an embodiment, the non-DNS packet is intercepted between a content server and a client device. In an example, the IP address is an IP address of a source of the data packet, and is determined by reading the IP address from a non-encrypted header of the non-DNS packet. According to an embodiment, the characteristic is a size of the data packet, a timestamp of the data packet, or a combination thereof.

At S1120, an entry in an identification table is identified. The entry includes the IP address and a hostname associated with the IP address, for example.

The entry is updated based on the characteristic at S1130. For example, when the entry includes an IP address field, a hostname field, a last active time field, and a number of cumulative bytes field, the last active time field is updated based on the timestamp of the data packet, and the number of cumulative bytes field is updated based on the size of the data packet.

Figure 12:
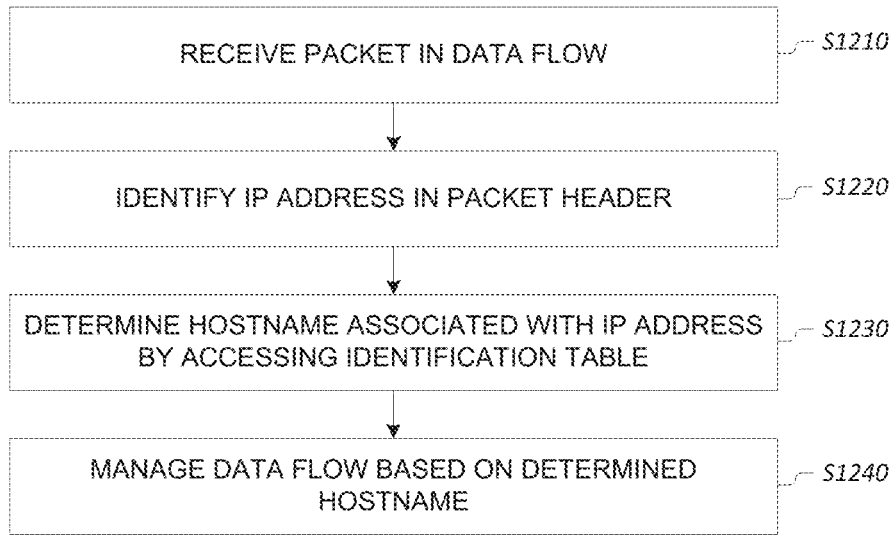
FIG. 12 illustrates a method of managing a data flow using an identification table according to an embodiment of the present disclosure.

FIG. 12 illustrates a method 1200 of managing a data flow using an identification table according to an embodiment of the present disclosure. The method 1200 is performed by a transport manager, for example.

At S1210, a packet in a data flow is received. The packet is, for example, a data packet including a header and a payload. The header is unencrypted. The payload is encrypted, and includes application layer data.

At S1220, an IP address is identified from the header of the packet. The IP address indicates a destination of the packet. In an embodiment, an IP address of a source of the packet is derived by reading the header of the packet. The IP address is an IP address of a content server, for example.

At S1230, a hostname associated with the identified IP address is determined by accessing an identification table. The identification table includes a plurality of IP address/hostname pairs in a plurality of entries. In an embodiment, the identification table is a cache table that is indexed by the IP addresses. Accordingly, the hostname associated with the identified IP address can be determined by identifying an entry in the identification table including the identified IP address, and reading the corresponding hostname in the identified entry.

The data flow is managed based on the identified hostname at S1240. For example, the data flow is paced when the identified hostname is determined to correspond to a host that has been historically associated with data traffic that is burdensome to a network. In a specific example, the data flow is identified as an elephant flow based on the identified hostname, and is paced.

Figure 13:
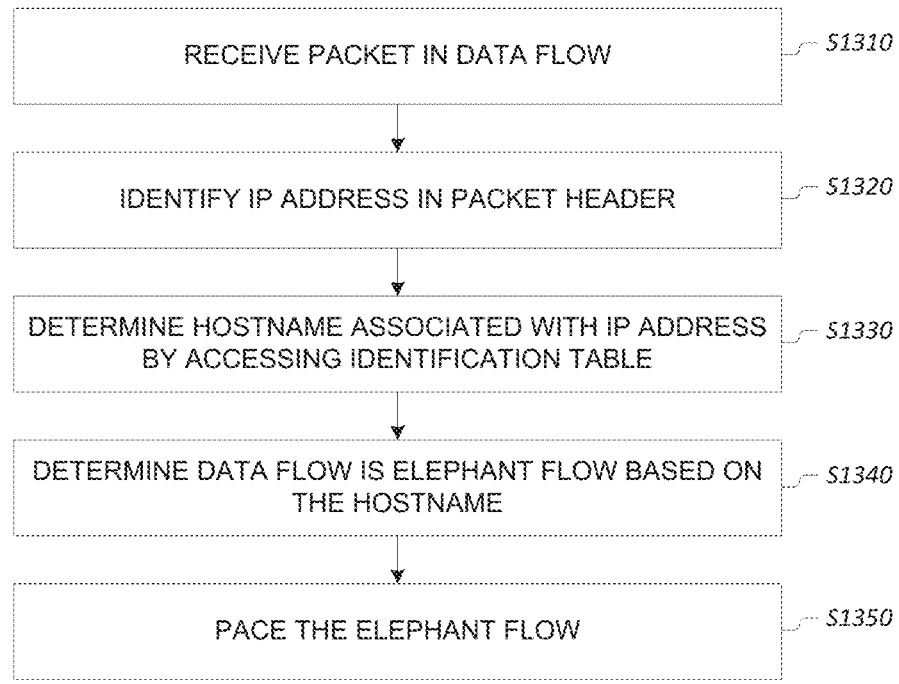
FIG. 13 illustrates a method of identifying and pacing an elephant flow using an identification table according to an embodiment of the present disclosure.

FIG. 13 illustrates a method 1300 of identifying and pacing an elephant flow using an identification table according to an embodiment of the present disclosure. The method 1300 is performed by a transport manager, for example.

At S1310, a packet in a data flow is received. The packet is a non-DNS data packet, for example. In an embodiment, a copy of the packet is temporarily cached, and the packet itself is released, so that it can reach its destination without any significant delays.

At S1320, an IP address is identified from the header of the packet. In an embodiment, the IP address indicates a destination of the packet or a source of the packet. In various embodiments, an IP address indicating the destination of the packet and an IP address indicating the source of the packet are both determined. The IP address is, for example, an IP address of a content server.

A hostname associated with the identified IP address is determined at S1330 by accessing an identification table. The identification table stores a plurality of previously identified hostname/IP address pairs, and is indexed by IP address. In an embodiment, the hostname is retrieved from an entry including the identified IP address.

At S1340, the data flow is determined to be an elephant flow based on the hostname. For example, the data flow is identified as an elephant flow when the hostname indicates a known video streaming host.

After the data flow is determined to be an elephant flow, the data flow is paced at S1350. In an embodiment, a plurality of data packets in the data flow traversing a network are managed after the data flow is determined to be an elephant flow. For example, the data packets of the data flow may be selectively routed over surplus network capacity. In a specific embodiment, the data packets of that data flow is selectively routed over a different network when the different network is available, such as a WIFI network that is connected to a client device receiving data packets in the data flow.

Figure 14:
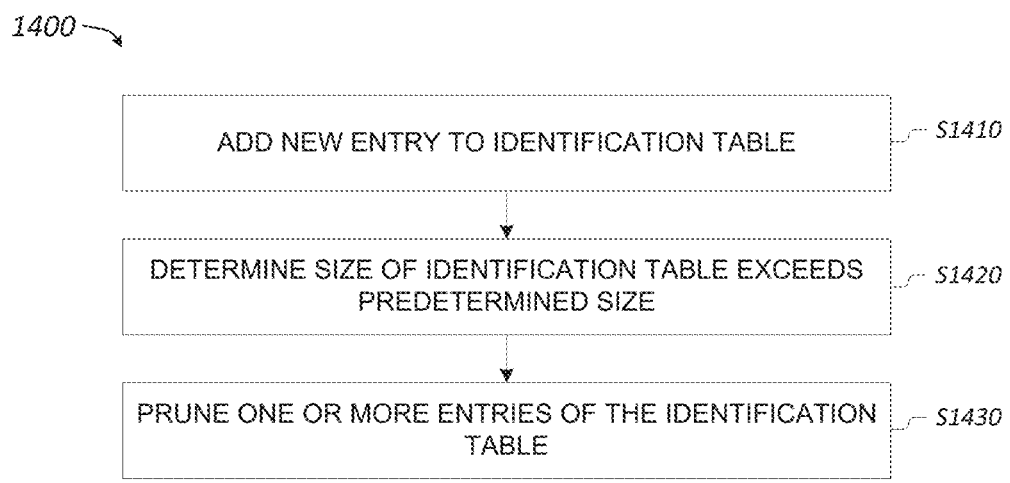
FIG. 14 illustrates a method of controlling a size of an identification table according to an embodiment of the present disclosure.

FIG. 14 illustrates a method 1400 of controlling a size of an identification table according to an embodiment of the present disclosure. The method 1400 is performed by a DNS spy, for example.

At S1410, a new entry is added to an identification table. The new entry includes a hostname/IP address pair. For example, the new entry includes a hostname/IP address pair that was not previously included in the identification table.

At S1420, a size of the identification table is determined to exceed a predetermined size. In various embodiments, the size is defined as a number of indices, an amount of memory required to store the identification table, or a combination thereof.

At S1430, one or more entries of the identification table are pruned from the identification table. For example, the one or more entries are deleted from the identification table.

The one or more pruned entries can be identified in various ways. In some embodiments, the one or more entries are the least significant entries of the identification table. The least significant entries can be identified based on characteristics fields of the identification table. For example, if each of the entries includes a timestamp indicating the most recent observed data packet corresponding to the hostname/IP address pairs, the entries with the oldest timestamps are pruned from the identification table. In another example, if each of the entries includes a number of transferred bytes observed to correspond to hostname/IP address pairs, the entries with the lowest number of transferred bytes are pruned from the identification table. In some embodiments, the one or more entries are identified based on a combination of multiple criteria.

A number of the one or more pruned entries can also be identified in various ways. For example, when the identification table reaches its maximum size, a predetermined percentage of entries are deleted from the identification table.

Figure 15:
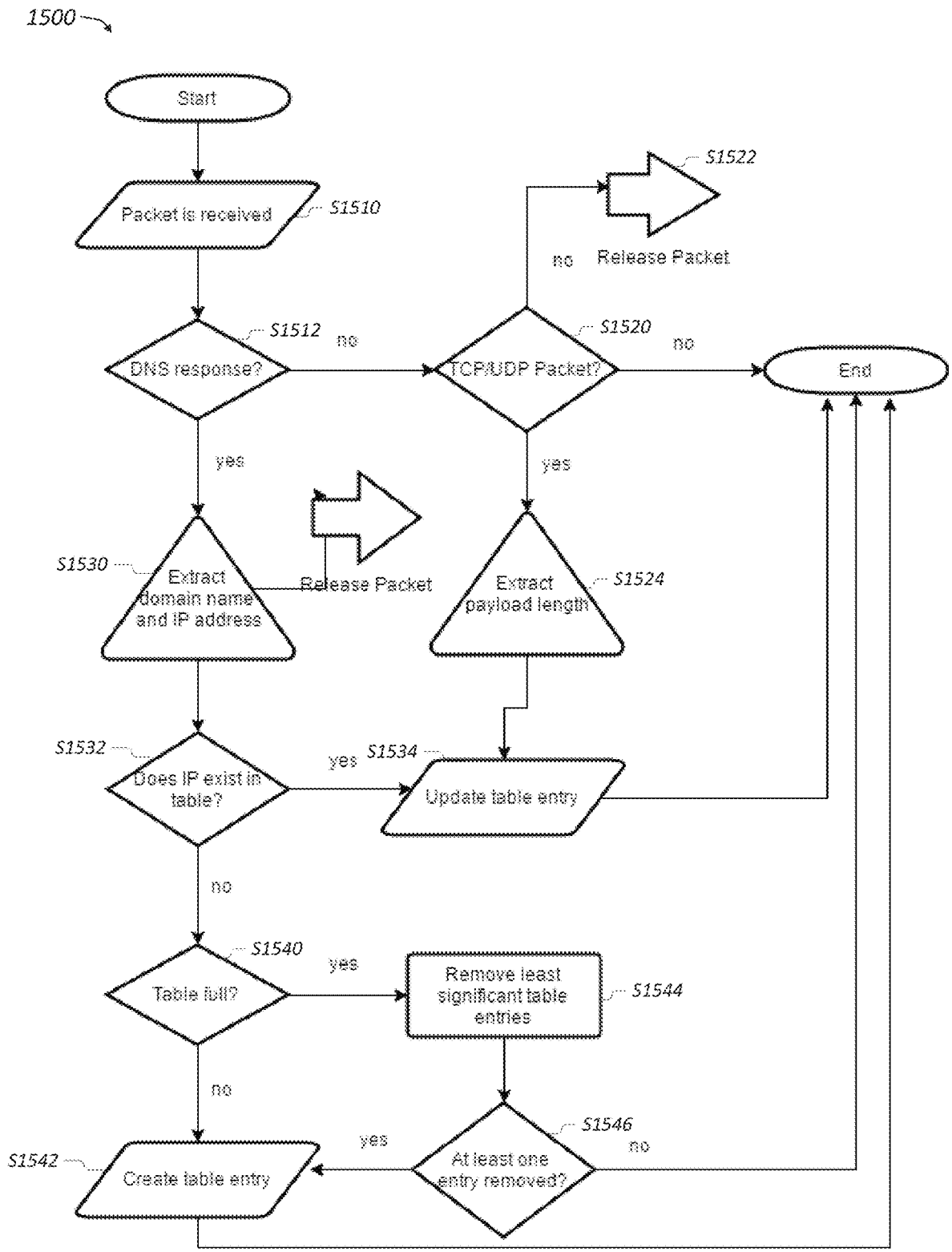
FIG. 15 illustrates a method of generating, using, and updating an identification table according to an embodiment of the present disclosure.

FIG. 15 illustrates a method 1500 of generating, using, and updating an identification table according to an embodiment of the present disclosure.

At S1520, a packet is received. For example, the packet is intercepted as it is being transmitted to a client device.

At S1520, the packet is inspected and identified as either a DNS response, a TCP or UDP payload packet, or neither.

When the packet is a DNS response, the packet is then parsed and a hostname and one or more IP addresses are extracted from the DNS response at S1330. According to an embodiment, the extracted data is enqueued for an independent process to analyze after the packet is released, to limit the amount of time the packet is held by the system and eliminate any impact on client/server communication latency.

When the packet is not a DNS response, the packet is examined to determine whether the packet is a non-DNS packet, such as a transmission control protocol (TCP) or user datagram protocol (UDP) packet, at S1520.

When the packet is a TCP/UDP packet, a length of a payload of the packet is examined at S1524. The packet is enqueued and released, so that the payload length is examined in an independent process to limit the amount of time the packet is held by the system and eliminate any impact on client/server communication latency. For example, the packet is enqueued and treated similarly as the independent process performed at S1330, so that the payload length is determined and analyzed after the packet is released.

If the packet is neither a DNS response or a TCP/UDP packet, the packet is released at S1522.

At S1532, the presence of the extracted IP address in an identification table is determined. For example, each of the enqueued items are read and compared to a plurality of entries in the identification table.

In the case when no existing table entry including the extracted IP address exists, identification table is determined to be full or not at S1540.

When the identification table is not full, a new table entry is created at S1540. According to various embodiments, the creation of new table entries effectively builds the identification table as a DNS cache, in which various hostname/IP address pairs are mapped to each other.

In the case where an entry does exist, the entry is updated based on the packet at S1534. The table entry, in some examples, includes the following fields: IP address, domain name, last active time, and cumulative bytes. The entries are stored in the identification table. The identification table is, for example, a hash table, indexed by the IP address.

When the identification table is full, one or more least significant entries in the identification table are pruned at S1544. That is, the hash table has a configurable maximum length, so that the identification table does not exceed a certain size. When the identification table has the maximum length, the identification table may be pruned to a percentage of its size, in an embodiment. In another embodiment, a predetermined number of entries are pruned. The entries are pruned by being deleted from the identification table, for example.

In various embodiments, the least significant entries are pruned from the identification table. In an embodiment, the least significant entries are entries including the lowest number of cumulative bytes recorded, the earliest last active time recorded, or a combination thereof. For example, a percentage of the entries corresponding to the lowest number of cumulative bytes are removed first, and in the case of a tie, the entries corresponding to the earliest Last Active Time are removed.

When it is determined that one or more entries are removed at S1546, the method 1500 returns to S1542, such that a new entry is generated in the identification table based on the packet without exceeding the maximum size of the identification table.

In various embodiments, data traffic through a network is managed by accessing the identification table. The identification table is accessed by querying by IP address, which will allow another system (or system with DNS Spy integration) to obtain the domain name of said IP address. In one version, this data is made available to a statistics collection system, which activates the collection of granular statistics on all traffic with a specific domain. In turn, these statistics can be used to determine the top n domains on a specified network.

Some examples of the granular statistical data that can be collected on a specific domain include (but are not limited to): Total Upstream/Downstream Bytes, Latency, Throughput, Goodput, Radio access type, Congestion Ratio, Bytes Transferred in flows that met a specified cumulative transferred byte threshold (standard flows, elephant flows, etc.), Stats broken down by time of day and or by location, or a combination thereof.

Embodiments provide a system and method for delivering packet data content across shared access networks in a manner that more evenly distributes aggregate user traffic in time, for example by moving traffic from times of bottleneck network congestion into following adjacent moments of surplus network capacity. The net effect of this redistribution of traffic may reduce intervals of peak usage and congestion (where the network is unable to supply enough throughput capacity for all users), which can result in higher allowed aggregate network utilization before network service quality degrades for the users.

The term "surplus network capacity" (aka "idle capacity") is understood in some embodiments to mean shared network capacity (e.g. network bandwidth, network resources) that may be used by embodiments of the invention for transferring portions or all of the data over a network, but is otherwise unused. In other words, if the network capacity is X and the current aggregate network traffic load is Y then the available surplus capacity is X-Y where Y cannot be larger than X. In an embodiment, one of the goals of using surplus network capacity is to use some or all the capacity Y to transfer data which implies that if Y is zero that the transfer slows or stops and yields the channel to other users' traffic sharing the network. In some scenarios, surplus network capacity in shared multi-user data networks is transient and can fluctuate randomly from moment to moment. Further, use of surplus as defined may be distinct from a fair-share or similar competitive shared use of network capacity (e.g. when the aggregate traffic load exceeds the network capacity limit X then each of N users sharing the network receives a X/N share of the network capacity).

In a specific embodiment, the system may uniquely identify a data traffic flow based on its associated client IP address and destination server IP address. The system may then characterize the traffic as a large flow based on parameters, such as throughput, bytes delivered, other characteristics, or a combination thereof. The system is a transport manager, for example.

The system may query the identification table generated by the DNS Spy, and determine that the hostname that the server IP address is associated with belongs to a known video provider (e.g., YOUTUBE). Thus, one conclusion could be made that the data flow is in fact a video due to its size and known destination.

This information may be made available to a transport manager, which enables specified management rules to be applied to a specified subset of traffic (such as a video in this example) that may or may not belong to a specific domain (such as YOUTUBE in this example). Rules may include policies that ensure that the managed traffic yields shared bandwidth to other traffic (i.e. uses surplus network capacity), is otherwise prioritized, or is marked to not apply any specific management.

According to various embodiments, the DNS Spy operates with a number of characteristics, such as 1) the separation of the DNS hostname/IP address resolution process from traffic characterization/management/statistics processes, 2) its ability to perform granular statistics collection on encrypted traffic flows, 3) the creation of a dynamic DNS cache that adapts to changing hostname/IP mappings in real time without requiring external manipulation, and 4) the application of the hostname/IP address mapping toward traffic management to improve network efficiencies.

According to an embodiment, a system builds a virtual DNS cache for its own internal use, but does not act as a virtual DNS server. The system intercepts DNS response packets sent across a network, extracts information from the DNS response packets, builds a table based on the extracted information, but does not modify or manipulate the DNS response packets sent across the network.

Embodiments of the present disclosure could be used to identify and track traffic to and from specific hostnames. In one version, the collected domain name information could be provided to a system that collects statistics on subset of traffic, single flows of traffic, or both. In another version, the information could be provided to a system that manages content delivery to and from UE terminals, which would apply specified management policies based on the domain name.

The system and methods comprising various embodiments of the present disclosure are used to analyze and manage data traffic between various client devices and content servers, but do not require modification to a user app installed on the client devices that requests content, or to a content server providing content, which enables rapid deployment into commercial networks, such as mobile cellular networks.

Various embodiments of the present disclosure address multiple technological problems associated with content delivery, wireless networks, security, and other technological fields.

For example, by generating an identification table that maps IP addresses to hostnames, network traffic can be effectively analyzed and data flows can be identified for management without performing computationally expensive decryption operations.

For example, by selectively managing data flows traversing a network based on hostnames associated with the data flows, network resources can be efficiently conserved and network congestion can be efficiently prevented.

For example, by selectively pruning the least significant entries of the identification table, the size of the identification table does not become unmanageable, but the identification table nevertheless maintains records of IP addresses and hostnames that are likely to be relevant for managing new data flows traversing the network.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

The invention claimed is:

1. A method, comprising:
intercepting a first data packet being transmitted from a domain name system (DNS) server to a first client device, the first data packet being a DNS response;
extracting a first internet protocol (IP) address and a first hostname from the first data packet;
storing the first IP address and the first hostname in a first entry of an identification table;
intercepting a second data packet being transmitted in a data flow from a content server to a second client device;
identifying a second IP address in a header of the second data packet;
determining whether the second IP address is in the first entry; and
in response to determining that the second IP address is in the first entry:
  determining, using the first entry, a first characteristic associated with the data flow, the first characteristic including an amount of transferred bytes associated with the first IP address;
  determining, based on the first characteristic, whether a traffic management policy should be applied to the data flow;
in response to determining that the data traffic management policy should be applied, applying the traffic management policy to the data flow to deliver the second data packet to the second client device;
determining whether the second IP address is equal to the first IP address; and
in response to determining that the second IP address is equal to the first IP address:
  determining a second characteristic of the second data packet; and
  updating the first entry of the identification table with the second characteristic.

2. The method of claim 1, wherein the second characteristic is an amount of bytes in the second data packet, a timestamp of the second data packet, or a combination thereof.

3. The method of claim 2, further comprising:
pruning the first entry from the identification table based on the second characteristic when the identification table exceeds a predetermined size.

4. The method of claim 1, wherein applying the traffic management policy to the data flow includes causing the data flow to be transferred to the second client device over surplus network capacity of a network, throttling the data flow, temporarily storing data packets of the data flow, rerouting the data flow, or a combination thereof.

5. The method of claim 1, wherein a payload of the second data is encrypted, and
wherein the IP address in the header of the second data packet is identified without performing decryption.

6. The method of claim 1, wherein extracting the IP address and the hostname from the first data packet includes reading the IP address and the hostname from resource records (RRs) in the DNS response.

7. The method of claim 6, wherein reading the IP address and the hostname from RRs in the DNS response includes reading the IP address in an 'RDATA' field of the DNS response and reading the hostname in a 'NAME' field of the DNS response.

8. The method of claim 1, wherein the identification table is a hash table.

9. The method of claim 1, wherein determining, based on the first characteristic associated with the data flow, whether the traffic management policy should be applied to the data flow includes determining that the traffic management policy should be applied by determining that the data flow is an elephant flow, by determining that a network transporting the data flow is congested, by determining that the data flow would be burdensome to the network transporting the data flow, by determining that the data flow is less important than other data being transported by the network transporting the data flow, or combinations thereof.

10. A system, comprising:
a processor; and
a memory storing program commands that, when executed by the processor, cause the processor to:
intercept a first data packet being transmitted from a domain name system (DNS) server to a first client device, the first data packet being a DNS response;
extract a first internet protocol (IP) address and a first hostname from the first data packet;
store the first IP address and the first hostname in a first entry of an identification table;
intercept a second data packet being transmitted in a data flow from a content server to a second client device;
identify a second IP address in a header of the second data packet;
determine whether the second IP address is in the first entry; and
in response to determining that the second IP address is in the first entry:
determine, using the first entry, a first characteristic associated with the data flow, the first characteristic including an amount of transferred bytes associated with the first IP address;
determine, based on the first characteristic, whether a traffic management policy should be applied to the data flow; and
in response to determining that the data traffic management policy should be applied, apply the traffic management policy to the data flow to deliver the second data packet to the second client device;
determine whether the second IP address is equal to the first IP address; and
in response to determining that the second IP address is equal to the first IP address:
determine a second characteristic of the second data packet; and
update the first entry of the identification table with the second characteristic.

11. The system of claim 10, wherein the processor extracts the first IP address and the hostname from the first data packet by reading the first IP address and the hostname from resource records (RRs) in the DNS response.

12. The system of claim 11, wherein reading the first IP address and the hostname from RRs in the DNS response includes reading the first IP address in an 'RDATA' field of the DNS response and reading the hostname in a 'NAME' field of the DNS response.

13. The system of claim 10, wherein determining, based on the first characteristic associated with the data flow, whether the traffic management policy should be applied to the data flow includes determining that the traffic management policy should be applied by determining that the data flow is an elephant flow, by determining that a network transporting the data flow is congested, by determining that the data flow would be burdensome to the network transporting the data flow, by determining that the data flow is less important than other data being transported by the network transporting the data flow, or combinations thereof.

14. The system of claim 10, wherein applying the traffic management policy to the data flow includes causing the data flow to be transferred to the second client device over surplus network capacity of a network, throttling the data flow, temporarily storing data packets of the data flow, rerouting the data flow, or a combination thereof.

15. A system, comprising:
a domain name system (DNS) spy including a first processor and a first memory, the first memory storing program commands that, when executed by the first processor, cause the first processor to:
extract a plurality of mappings, each mapping including a respective internet protocol (IP) address and a respective hostname, from a plurality of first data packets, respectively, each of the first data packets being a DNS response; and
store the plurality of mappings in a plurality of entries of an identification table, the identification table being indexed by the respective IP addresses of the mappings;
extract a first IP address from a header of a first non-DNS packet;
determine whether the first IP address is equal to an IP address of a first entry of the plurality of entries of the identification table; and
in response to determining that the first IP address is equal to the IP address of a first entry of the identification table:
determine a second characteristic of the first non-DNS packet; and
updating the first entry of the identification table with the second characteristic; and
a transport manager including a second processor and a second memory, the second memory storing program commands that, when executed by the second processor, cause the second processor to:
extract a second IP address from a header of a non-DNS packet of a data flow;

determine an amount of transferred bytes corresponding to the second IP address using a second entry of the plurality of entries of the identification table, the second entry including the second IP address; and determine whether to apply a traffic management policy to the data flow based on the amount of transferred bytes; and in response to determining that the data traffic management policy should be applied, apply the traffic management policy to the data flow to deliver the second data packet to the second client device.

16. The system of claim 15, wherein the transport manager determines to apply the traffic management policy to the data flow when the amount of transferred bytes is greater than a threshold.

17. The system of claim 15, wherein the transport manager applies the traffic management policy by causing the data flow to be transferred to the second client device over surplus network capacity of a network, by throttling the data flow, by temporarily storing data packets of the data flow, by rerouting the data flow, or a combination thereof.

* * * * *